United States Patent
Joye et al.

(10) Patent No.: US 7,386,123 B2
(45) Date of Patent: *Jun. 10, 2008

(54) METHOD OF IMPLEMENTING IN AN ELECTRONIC COMPONENT A CRYPTOGRAPHIC ALGORITHM FOR FINDING THE PUBLIC EXPONENT

(75) Inventors: Marc Joye, Saint Zacharie (FR); Pascal Paillier, Paris (FR); Florence Ques-Rochat, Asnieres sur Seine (FR); Karine Villegas, Gemenos (FR); Nathalie Feyt, Cuges les Pins (FR); Benoit Chevallier Mames, Cassis (FR)

(73) Assignee: Gemplus, Gemenos (FR)

( * ) Notice: Subject to any disclaimer, the term of this patent is extended or adjusted under 35 U.S.C. 154(b) by 250 days.

This patent is subject to a terminal disclaimer.

(21) Appl. No.: 10/490,413

(22) PCT Filed: Sep. 5, 2002

(86) PCT No.: PCT/FR02/03021

§ 371 (c)(1),
(2), (4) Date: Oct. 12, 2004

(87) PCT Pub. No.: WO01/55838

PCT Pub. Date: Aug. 2, 2001

(65) Prior Publication Data

US 2005/0084096 A1    Apr. 21, 2005

(30) Foreign Application Priority Data

Sep. 24, 2001 (FR) .................................. 01 12274

(51) Int. Cl.
*H04L 9/30* (2006.01)

(52) U.S. Cl. ............................................ 380/30; 380/28

(58) Field of Classification Search ............ 380/28–30, 380/255, 259, 277, 285, 44, 46; 713/174
See application file for complete search history.

(56) References Cited

U.S. PATENT DOCUMENTS 4,736,423 A * 4/1988 Matyas ....................... 713/185

(Continued)

FOREIGN PATENT DOCUMENTS

EP    0 202 768 A    11/1986

(Continued)

OTHER PUBLICATIONS

Boneh, D et al., "On the importance of checking cryptographic protocols for faults." Advances in Cryptology—Eurocrypt '97. International Conference on the Theory and Application of Cryptographic Techniques Proceedings. Berlin, Germany, Springer-Verlag, Germany, 1997, pp. 37-51.

*Primary Examiner*—Nasser Moazzami
*Assistant Examiner*—Nirav Patel
(74) *Attorney, Agent, or Firm*—Buchanan Ingersoll & Rooney PC

(57) ABSTRACT

The invention concerns a method for implementing in an electronic component a cryptographic algorithm using calculating means. The invention is characterized in that it consists in carrying out the following steps: a) selecting a value e among a specific number of values $e_i$, $e_i$ being integers, b) checking if $e_i$ verifies a predetermined relationship: if so, then $e=e_i$, and storing e for use in calculating said cryptographic algorithm.

15 Claims, 1 Drawing Sheet

U.S. PATENT DOCUMENTS

Figure 1:
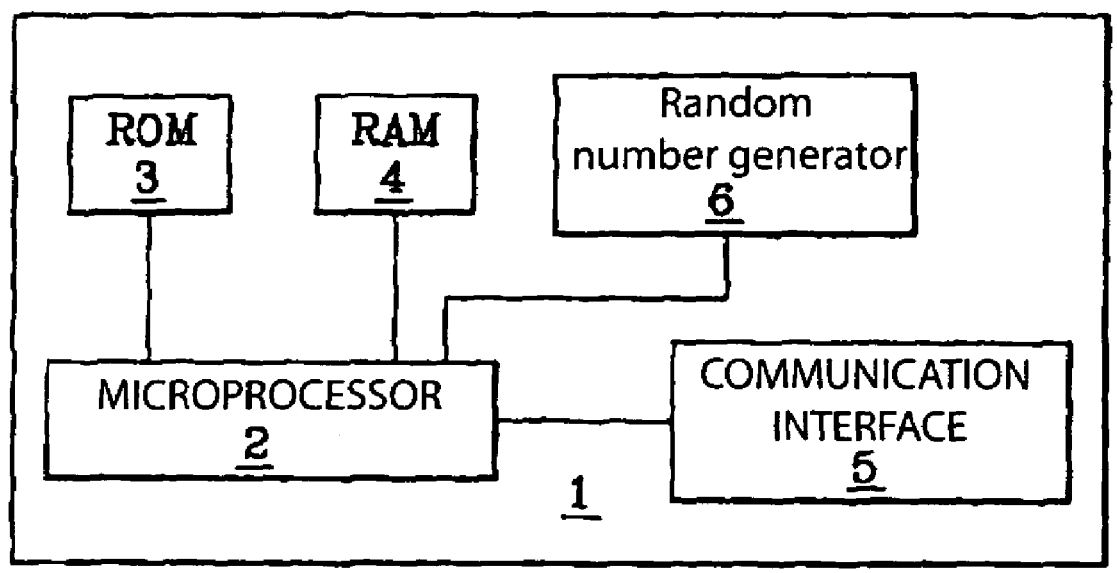

| | | | | |
|---|---|---|---|---|
| 5,991,415 A | * | 11/1999 | Shamir | 380/30 |
| 6,144,740 A | * | 11/2000 | Laih et al. | 380/2 |
| 6,965,673 B1 | * | 11/2005 | Boneh et al. | 380/28 |
| 2004/0215685 A1 | * | 10/2004 | Seifert et al. | 708/492 |
| 2006/0210066 A1 | * | 9/2006 | Villegas et al. | 380/28 |

FOREIGN PATENT DOCUMENTS

| | | | |
|---|---|---|---|
| WO | 98 52319 A | | 11/1998 |
| WO | 99 35782 A | | 7/1999 |
| WO | WO 99/49416 | * | 9/1999 |
| WO | WO 00/24155 | * | 4/2000 |
| WO | WO 01/55838 | * | 8/2001 |

* cited by examiner

METHOD OF IMPLEMENTING IN AN ELECTRONIC COMPONENT A CRYPTOGRAPHIC ALGORITHM FOR FINDING THE PUBLIC EXPONENT

The invention concerns a method of implementing, in an electronic component, a cryptographic algorithm.

The invention also relates to the corresponding electronic component.

Such components are used in applications where access to services or data is severely controlled. They have an architecture formed around a microprocessor and memories, including a program memory of the ROM type ("Read Only Memory" in English) which contains the secret number or numbers d.

These components are used in computer systems, on board or not; they are in particular used in chip cards, for certain applications thereof. These are for example applications of access to certain databanks, banking applications, remote payment applications, for example for television, petrol dispensing or passage through motorway tolls.

These components or cards therefore use a cryptographic algorithm for ensuring the enciphering of data sent and/or the deciphering of data received when these must remain confidential.

In general terms and briefly, the function of these cryptographic algorithms is in particular the enciphering or the digital signature of the message. From this message applied as an input to the card by a host system (server, bank dispenser etc) and many secrets contained in the card, the card in return supplies to the host system the enciphered or signed message, which for example enables the host system to authenticate the component or the card, to exchange data, etc.

The characteristics of the cryptography algorithms are known: calculations made, parameters used. The only unknown is the secret number or numbers contained in program memory. The entire security of these cryptography algorithms relates to this secret number or numbers contained in the card and unknown to the world outside this card. This secret number cannot be deduced solely from knowledge of the message applied as an input and the enciphered message supplied in return.

However, it has become clear that external attacks enable ill-intentioned third parties to find the secret number or numbers contained in this card. In the field of chip cards, amongst others, there exist several possible attacks, one of which is known as "fault attack".

In this type of attack, the attacker injects any error during the calculation of a cryptographic algorithm, for the purpose of exploiting the presence of this error in order to extract secret information.

The error may also result from a calculation error due to the hardware implementing the cryptographic algorithm; it is nevertheless considered, in either case, that it is a case of a fault attack.

This type of attack can in particular be envisaged with the RSA algorithm (from the name of its authors) Rivest, Shamir and Adleman), which is the most used in cryptography in this field of application. The security of the RSA algorithm is based on the difficulty of factorising large numbers. These algorithms use in particular exponentiation calculations to the power of d, d being a secret number.

The principal steps of the RSA algorithm are stated briefly.

A number N is established which is the product for two prime numbers p and q ($N=p \cdot q$), and a public exponent or public key e and a private exponent or private or secret key d, satisfying the equation:

$$e \cdot d = 1 (\text{modulo } \lambda(N)), \quad (1)$$

$\lambda(\cdot)$ being the Carmichael function.

According to a first embodiment of the so-called standard RSA algorithm, the public parameters are (N,e) and the private parameters are (N,d). Given x lying in the range ]0,N[, the public operation on x, which may for example be the enciphering of the message x or the checking of the signature x, consists of calculating:

$$y = x^e \text{ modulo } N \quad (2)$$

The corresponding private operation, which may for example be the deciphering of the enciphered message or the generation of a signature x, consists of calculating:

$$y^d \text{ modulo } N \quad (3)$$

with $x = y^d$ modulo N since $e \cdot d = 1$ (modulo $\lambda(N)$).

Another operating mode known as CRT mode since it is based on the Chinese remainder theorem ("Chinese Remainder Theorem" or CRT in English) and four times faster than that of the standard RSA algorithm, will be presented. According to this CRT mode RSA, the calculations are not performed directly modulo N but first of all calculations are performed modulo p and modulo q.

The public parameters are (N,e) but the private parameters are (p,q,d) or ($p,q,d_p,d_q, i_q$) with $$d_p = d \text{ modulo } (p-1), d_q d \text{ modulo } (q-1)$$

and $i_q = q^{-1}$ modulo p.

By means of equation (1), there are obtained:

$$ed_p = 1 \text{ modulo } (p-1) \text{ and } ed_q = 1 \text{ modulo } (q-1) \quad (4)$$

The public operation is performed in the same way as with the standard operating mode; on the other hand, for the private operation, there are first of all calculated:

$$x_p = y^{d_p} \text{ mod } p \text{ and } x_q = y^{d_q} \text{ mod } q$$

next, by application of the Chinese remainder theorem, $x = y^d$ mod N is obtained by:

$$x = CRT(x_p, x_q) = x_q + q[i_q(x_p - x_q) \text{modulo } p] \quad (5)$$

The RSA algorithm has been presented with two prime factors p and q in order to simplify the disclosure. It is possible to extend it to the case where N is the product of two integers p and q such that hcf(p,q)=1. In this case, $$d_p = d \text{ (modulo } \lambda(p)), d_q = d \text{ (modulo } \lambda(q)),$$

$i_q$ remains unchanged compared with the previous case, $$ed_p = 1 \text{ (modulo } \lambda(p)) \text{ and } ed_q = 1 \text{ (modulo } \lambda(q)),$$

and the calculations of $x_p$, $x_q$ and x are unchanged.

This extension applies both to standard mode and to CRT mode.

A description will now be given of an example of a fault attack based on the obtaining of two signatures of the same message, one correct x and the other incorrect denoted ^x.

The incorrect signature was for example obtained in the following manner. The attacker, by any method, injects an error during the calculation of $x_p$, but not during that of $x_q$. The value of $x_p$ is then incorrect and denoted $\hat{x}_p$. On the other hand, the value of $x_q$ is correct. Because of this, when the values $\hat{x}_p$ and $x_q$ are recombined by applying the Chinese remainder theorem, the resulting signature ^x is incorrect.

It then suffices for the attacker, who of course also knows the public parameters (N,e), to calculate the highest common factor (hcf) with N, that is to say:

$$hcf(\hat{x}-x, N).$$

However, $hcf(\hat{x}-x, N)=q$. He then obtains the secret factor q and therefore p and $d_p$ and $d_q$. Because of this, the RSA code is effectively broken.

In other words, if someone is capable of injecting any error during a calculation modulo p whilst the calculation modulo q is correct or vice-versa, he can completely break the RSA code.

It is also possible to break the RSA code using an incorrect signature of a known message. Several cases of fault attacks are presented in the publication "On the Importance of Checking Cryptographic Protocols for Faults" by D. Boneh, R. A. DeMillo and R. J. Lipton, Advances in Cryptology, EUROCRYPT'97, pp. 37-51, to which reference can be made.

A first countermeasure for avoiding this type of scenario consists of recalculating the entire algorithm. The values obtained at the end of the successive calculations are compared. If they are identical, it is assumed that no fault has been injected. A problem with this approach is that it does not detect a permanent fault. For example, it is not possible to discern an attack in which the error injected consists of the value of a memory bit always being fixed at 0 or at 1 ("sticky bit" in English).

Another countermeasure to the fault attack is described by Shamir in the patent document WO 98 52319.

According to this countermeasure the following algorithm is proceeded with:

1. Choose a random number r of low value,
2. Calculate:

$$x_{rp}=y^d \text{ modulo } r.p, \text{ and}$$

$$x_{rq}=y^d \text{ modulo } r.q;$$

3. If $x_{rp} \neq x_{rq}$ (modulo r), then there is a fault (perhaps caused by an attack) and therefore interruption of the algorithm, otherwise
4. Apply the Chinese remainder theorem to $x_{rp}$ and $x_{rq}$, in order to issue x as an output.

Thus the calculations are performed respectively modulo r.p and modulo r.q instead of modulo p and modulo q. Next, it is checked that the two values $x_{rp}$ and $x_{rq}$ obtained by these calculations are also modulo r. If these two values are different, it is certain that there has been an error. On the other hand, if they are equal, it can be assumed that there is no error, with a probability of 1/r of being mistaken in this assumption.

One drawback of this method is that it is probabilistic, that is to say the errors are detected with a probability of less than 1 and that consequently they are not all detected. In addition it is expensive in calculation time. Another drawback of the Shamir method is that it functions only for the CRT mode. However, it can also be envisaged using the standard mode of the RSA algorithm.

The best possible protection for protecting from fault attacks consists of checking that the value x obtained during the private operation (3) or (5) (that is to say either in standard mode or in CRT mode of the RSA algorithm) satisfies equation (2) $y=x^e$ modulo N of the public operation. This is because, when this equation is satisfied, it is possible to be sure that there has been no error during the performance of the private operation of the RSA algorithm.

However, the component or device implementing the private operation does not always have available the public exponent e, in particular when it executes only the private operation.

In the light of the above, the invention proposes a method for performing certain steps of a cryptographic algorithm using a public exponent e which is not known a priori.

This method makes it possible in particular to effect a countermeasure, in particular to fault attacks, which offers the best possible protection even when the public exponent e is not known.

The object of the invention is a method of implementing, in an electronic component, a cryptography algorithm using calculation means, principally characterised in that it consists of performing the following steps:

a) choosing a value e from amongst a given number of values $e_i$, $e_i$ being integer numbers, b) testing whether the value $e_i$ chosen satisfies a predetermined equation:

if such is the case, then $e=e_i$, and storing e with a view to its use in calculations of the said cryptography algorithm, if such is not the case, reiterating the previous steps choosing another value of $e_i$ and if no value of $e_i$ can be attributed to e then noting that the calculations of the said cryptography algorithm using the value e cannot be made.

According to one embodiment of the invention, it consists, prior to step b), of choosing a value Y lying in the range ]0,N[ and allocating to a value X the result of the operation $Y^d$ modulo N, d and N being given integer numbers, and it consists of the predetermined equation of step b) being $$X^{ei} \bmod N = Y$$

Preferably Y=2 is chosen.

The cryptography algorithm can be based on an algorithm of the RSA type, in particular in standard mode or in CRT mode.

According to another embodiment, the predetermined equation of step b) is: $e_i d_p=1$ (modulo $\lambda(p)$), p and $d_p$ being given integer numbers and $\lambda(.)$ being the Carmichael function.

The number $d_p$ can be obtained by $d_p=d$ (modulo $\lambda(p)$), d being a predetermined integer.

According to one characteristic of the invention, $d_q$ and q being given integer numbers, with $hcf(p,q)=1$, step b) consists of performing the following steps:

testing whether $e_i d_p=1$ (modulo $\lambda(p)$), if such is the case, and if $e_i < \lambda(p)$, then $e=e_i$ and storing e with a view to its use in calculations of the said cryptography algorithm, if such is the case, and if $e_i \geq \lambda(p)$, then testing whether $e_i d_q=1$ (modulo $\lambda(q)$); if such is the case, then $e=e_i$ and storing e with a view to its use in calculations of said cryptography algorithm, if one of the above two tests is not satisfied, reiterating the previous steps using another value of $e_i$ and if no value of $e_i$ can be attributed to e then noting that the calculations of the said cryptography algorithm using the value e cannot be made.

The number $d_q$ can be obtained by $d_q=d$ (modulo $\lambda(q)$), d being a predetermined integer.

The cryptography algorithm is advantageously based on an algorithm of the RSA type in CRT mode.

Preferably $e_i=2^{16}+1$ or $e_i=3$ is chosen.

According to one characteristic of the invention, a value $e_i$ having been allocated to e, it consists of obtaining, at the end of a private operation of the RSA algorithm, a value x from a value y and of the fact that the said calculation using a value e consist of checking whether $y=x^e$ modulo N, N being a predetermined integer number.

Another object of the invention is an electronic security component comprising calculation means, a program memory and a working memory and data communication means, characterised in that it implements the method as previously described.

The invention relates in particular to a chip card comprising an electronic component as described above.

Other particularities and advantages of the invention will emerge clearly from a reading of the description given by way of non-limiting example and with regard to the accompanying FIG. 1, which depicts schematically the elements of a chip card able to implement the invention.

The embodiments are described in the context of chip cards, but can of course apply to any other electronic security device or component provided with cryptographic calculation means.

As shown in FIG. 1, the chip card 1 comprises a microprocessor 2 coupled to a fixed memory (ROM) 3 and a random access memory (RAM) 4, the whole forming an assembly allowing, amongst other things, the execution of cryptographic algorithms. More precisely, the microprocessor 2 comprises the arithmetic calculation means necessary for the algorithm, as well as circuits for transferring data with the memories 3 and 4. The fixed memory 3 contains the program executing the cryptographic algorithm in source code form, whilst the random access memory 4 comprises registers able to be updated for storing results of the calculations.

The chip card 1 also comprises a communication interface 5 connected to the microprocessor 2 to allow the exchange of data with the external environment. The communication interface 5 can be of the "contact" type, being in this case formed by a set of contact pins intended to connect to a contactor of an external device, such as a card reader, and/or of the "contactless" type. In the latter case, the communication interface 5 comprises an antenna and radio communication circuits allowing data transfer by wireless connection. This connection can also allow a transfer of energy supplying the circuits of the card 1.

A description will now be given of a method for validating the value of a public exponent e which is not known a priori.

It is based on the following observation: in 90% of cases, the value of e is $e_0=2^{16}+1$, in 5% of cases the value of e is $e_1=3$ and in other cases the value of e is other.

The method then consists of choosing $e_0$ and verifying that $e=e_0$; if $e \neq e_0$, then an attempt is made with $e_1$.

It may happen that, for a certain application corresponding to 5% of other cases, e is not equal to either $e_0$ or $e_1$. Thus the value of e is more generally designated by $e_i$. And the method finally consists of choosing a value $e_i$ from amongst the $e_i$ values envisaged and verifying that $e=e_i$.

According to a first embodiment, valid for the standard or CRT modes of the RSA algorithm:
a value Y lying within a range ]0,N[, is arbitrarily chosen,
a value $e_i$ is chosen,
a calculation is made of $X=Y^d$ modulo N by (3) in standard mode or by (5) in CRT mode
if $X^{ei}$ mod N=Y then $e=e_i$
and e is stored
otherwise another value is chosen for $e_i$.

It is possible advantageously to choose Y=2 so as to accelerate the exponentiation calculation $Y^d$ which appears in equation (3) or (5): this then amounts to making additions instead of multiplications.

Another embodiment based on equation (4) is now described; it is valid only in CRT mode but is then more effective than the previous embodiment;
a value $e_i$ is chosen,
it is tested whether $e_i d_p=1$ modulo(p−1), (or whether $e_i d_p=1$ (modulo $\lambda(p)$) in the general case)
if yes and if $e_i<p$ (or if $e_i<\lambda(p)$ in the general case), then $e=e_i$ and e is stored
if yes and if $e_i \geq p$, (or if $e_i \geq \lambda(p)$ in the general case) then $e=e_i$ with a very high probability of around 1−2/p.

In the case where $e_i \geq p$ (or if $e_i \geq \lambda(p)$ in the general case), the ambiguity can be removed with a probability of 1 by testing whether $e_i d_q=1$ modulo(q−1) (or whether $e_i d_q=1$ (modulo $\lambda(q)$) in the general case). If such is the case, $e=e_i$ and e is stored.

However, in the majority of cases ($e_i=2^{16}+1$ or $e_i=3$), $e_i<p$ (or $e_i<\lambda(p)$ in the general case) since p has a size of 512 bits or more.

If one of the tests is not satisfied, another value is chosen for $e_i$.

If for one or other embodiment there does not exist amongst the $e_i$ values a value such that $e=e_i$, then it is not possible to make the calculations involving e.

When e is known, through one or other of these embodiments, it is then possible to verify each private operation (3) or (5) by checking that $y=x^e$ modulo N or more generally to make calculations using the value e which is stored.

As has been seen, this method can of course be applied to a countermeasure.

It is more rapid than the countermeasure described in the prior art which consists of recalculating the whole of the algorithm, that is to say making at least a second exponentiation calculation to the power of d, d being the size of N, and comparing the values obtained at the end of the successive calculations. The method according to the invention also consists of making a second exponentiation calculation but to the power of e; however, e is small.

It also makes it possible to detect a permanent fault.

It applies both in the case of the standard mode of the RSA algorithm and in the case of the CRT mode as well as the extension of these modes.

The invention claimed is:

1. A method of implementing, in an electronic component, a cryptography algorithm comprising the following steps:
   a) choosing a value e from amongst a given number of values $e_i$, $e_i$ being integer numbers;
   b) testing whether the chosen value $e_i$ satisfies a predetermined equation;
   c) if such is the case, then establishing $e=e_i$, and storing e;
   d) if such is not the case, reiterating the previous steps choosing another value of $e_i$;
   e) performing a cryptographic operation on data using the stored value for e as a public key; and
   f) if no value of $e_i$ can be attributed to e, then noting that cryptographic operations using the value e cannot be made.

2. A method according to claim 1, further including the steps, prior to step b), of choosing a value Y lying in the range ]0,N[ and allocating to a value X the result of the operation $y^d$ modulo N, where d and N are given integer numbers, and wherein the predetermined equation of step b) is $$X^{ei} \bmod N = Y.$$

3. A method according to claim 2, wherein Y=2.

4. A method according to claim 1 wherein the cryptographic operation is based on an algorithm of the RSA type.

5. A method according to claim 4, wherein the RSA-type algorithm is in standard mode or CRT mode.

6. A method according to claim 1, wherein the predetermined equation of step b) is: $e_i d_p = 1$ (modulo $\lambda(p)$), where p and $d_p$ are given integer numbers and $\lambda(.)$ is the Carmichael function.

7. A method according to claim 6, wherein $d_p = d$ (modulo $\lambda(p)$), where d is a predetermined integer.

8. A method according to claim 6, wherein, $d_q$ and q are given integer numbers, with hcf(p,q)=1, and wherein step b) comprises the following steps:
testing whether $e_i d_p = 1$ (modulo $\lambda(p)$),
if such is the case, and if $e_i < \lambda(p)$, then establishing $e = e_i$ and storing e,
if such is the case, and if $e_i \geq \lambda(p)$, then testing whether $e_i d_q = 1$ (modulo $\lambda(q)$); if such is the case, then establishing $e = e_i$ and storing e,
if one of the above two tests is not satisfied, reiterating the previous steps using another value of $e_i$ and if no value of $e_i$ can be attributed to e then noting that cryptographic operations using the value e cannot be made.

9. A method according to claim 8, wherein $d_q = d$ (modulo $\lambda(q)$), where d is a predetermined integer.

10. A method according to claim 6, wherein the cryptographic operation is based on an algorithm of the RSA type in CRT mode.

11. A method according to claim 1, wherein $$e_i = 2^{16} + 1.$$

12. A method according to claim 1, wherein $e_i = 3$.

13. A method according to claim 1 and according to which a value $e_i$ has been allocated to e, further including the steps of obtaining, at the end of a private operation of the RSA algorithm, a value x from a value y, wherein said operation using the value e comprises verifying whether $y = x^e$ modulo N, where N is a predetermined integer number.

14. An electronic security component, comprising calculation means, a program memory and a working memory, and data communication means, wherein said calculation means executes the following operations:
choosing a value e from amongst a given number of values $e_i$, $e_i$ being integer numbers,
testing whether the chosen value $e_i$ satisfies a predetermined equation,
if such is the case, then establishing $e = e_i$, and storing e,
if such is not the case, reiterating the previous steps choosing another value of $e_i$,
performing a cryptographic operation on data using the stored value for e as a public key, and
if no value of $e_i$ can be attributed to e, then noting that cryptographic operations using the value e cannot be made.

15. A chip card comprising an electronic component according to claim 14.

* * * * *